US012799036B2

(12) United States Patent

Nakamura et al.

(10) Patent No.: US 12,799,036 B2

(45) Date of Patent: Nov. 17, 2026

(54) CERAMIC MATRIX COMPOSITE AND METHOD FOR MANUFACTURING SAME

(71) Applicant: IHI Corporation, Tokyo (JP)

(72) Inventors: Takeshi Nakamura, Tokyo (JP); Hiroto Hirano, Tokyo (JP); Masahiro Kotani, Tokyo (JP); Takahiko Shinohara, Tokyo (JP)

(73) Assignee: IHI Corporation, Tokyo (JP)

( * ) Notice: Subject to any disclaimer, the term of this patent is extended or adjusted under 35 U.S.C. 154(b) by 1260 days.

(21) Appl. No.: 17/658,363

(22) Filed: Apr. 7, 2022

(65) Prior Publication Data

US 2022/0227674 A1 Jul. 21, 2022

Related U.S. Application Data

(63) Continuation of application No. PCT/JP2020/038551, filed on Oct. 13, 2020.

(30) Foreign Application Priority Data

Oct. 17, 2019 (JP) ................................ 2019-190326

(51) Int. Cl.

*C04B 35/50* (2006.01)

*C04B 35/626* (2006.01)

(Continued)

(52) U.S. Cl.

CPC ........ *C04B 35/50* (2013.01); *C04B 35/62665* (2013.01); *C04B 35/653* (2013.01); (Continued)

(58) Field of Classification Search

None

See application file for complete search history.

(56) References Cited

U.S. PATENT DOCUMENTS 10,604,454 B1 * 3/2020 Zhu ........................ C04B 41/89

2006/0014029 A1 * 1/2006 Saak ........................ C04B 41/52 428/446

(Continued)

FOREIGN PATENT DOCUMENTS

BQ 10 2015 205 595 B3 3/2016

CN 107640976 A 1/2018

(Continued)

OTHER PUBLICATIONS

Murakami, Y., et al., "Phase Equilibria and Properties of Glasses in the Al2O3—Yb2O3—SiO2 System," J. Ceramic Soc. of Japan 101 (10) [1993], pp. 1101-1106. (Year: 1993).*

(Continued)

*Primary Examiner* — Amber R Orlando

*Assistant Examiner* — Paul Alan Forsyth

(74) *Attorney, Agent, or Firm* — Oblon, McClelland, Maier & Neustadt, L.L.P.

(57) ABSTRACT

A ceramic matrix composite includes a substrate which contains a fibrous body formed from a silicon carbide fiber, and a matrix which is formed in the substrate, and which contains $RE_3Al_5O_{12}$, $RE_2Si_2O_7$, and the balance being an oxide of RE, Al, and Si, or $RE_2SiO_5$, where the RE is Y or Yb.

9 Claims, 10 Drawing Sheets

(51) Int. Cl.
*C04B 35/653* (2006.01)
*C04B 35/80* (2006.01)

(52) U.S. Cl.
CPC ...... *C04B 35/80* (2013.01); *C04B 2235/3217* (2013.01); *C04B 2235/3224* (2013.01); *C04B 2235/3427* (2013.01); *C04B 2235/5244* (2013.01)

(56) References Cited

U.S. PATENT DOCUMENTS

| | | | | |
|---|---|---|---|---|
| 2011/0256411 | A1* | 10/2011 | Courcot | C04B 41/89 428/446 |
| 2013/0009348 | A1 | 1/2013 | Murata et al. | |
| 2013/0189531 | A1* | 7/2013 | Lee | C04B 41/009 428/448 |
| 2016/0024962 | A1 | 1/2016 | Luthra | |
| 2018/0037515 | A1* | 2/2018 | Matsumoto | C04B 41/87 |
| 2019/0152861 | A1* | 5/2019 | Bouillon | C04B 35/185 |
| 2020/0024198 | A1 | 1/2020 | Sato et al. | |

FOREIGN PATENT DOCUMENTS

| | | | | |
|---|---|---|---|---|
| EP | 3 010 024 | A1 | 4/2016 | |
| EP | 3010024 | B1 * | 11/2017 | C04B 41/52 |
| JP | 2-296770 | A | 12/1990 | |
| JP | 10-59780 | A | 3/1998 | |
| JP | 2000-7453 | A | 1/2000 | |
| JP | 2016-516153 | A | 6/2016 | |
| WO | WO 2011/122593 | A1 | 10/2011 | |
| WO | WO 2014/199459 | A1 | 12/2014 | |
| WO | WO 2016/129591 | A1 | 8/2016 | |
| WO | WO 2018/037617 | A1 | 3/2018 | |

OTHER PUBLICATIONS

International Search Report issued Dec. 15, 2020 in PCT/JP2020/038551 filed Oct. 13, 2020, 2 pages.

Extended European Search Report issued Oct. 11, 2023 in European Patent Application No. 20876596.6, 5 pages.

* cited by examiner

CERAMIC MATRIX COMPOSITE AND METHOD FOR MANUFACTURING SAME

CROSS REFERENCE TO RELATED APPLICATIONS

This application is a continuation application of International Application No. PCT/JP2020/038551, filed on Oct. 13, 2020, which claims priority to Japanese Patent Application No. 2019-190326, filed on Oct. 17, 2019, the entire contents of which are incorporated by references herein.

BACKGROUND

1. Field

The present disclosure relates to a ceramic matrix composite and a method for manufacturing the same.

2. Description of the Related Art

A ceramic matrix composite (CMC) has a specific gravity of ⅓ or less compared to a heat resistant metal material, such as Ni-based alloys, and has excellent heat resistance. For this reason, the ceramic matrix composite is noticed as a high-temperature material for an aircraft engine and the like. Among methods for manufacturing the ceramic matrix composite, a melt infiltration method, in which a matrix is formed by infiltrating molten silicon, enables to manufacture a dense ceramic matrix composite in a short time. In such a method for manufacturing the ceramic matrix composite, a matrix having a silicon carbide as a main phase is formed by infiltrating a preform, which contains a fiber bundle obtained by bundling ceramic fibers, with a carbon powder, and then melt-infiltrating the preform with molten silicon and reaction-sintering the preform. See Japanese Unexamined Patent Application Publication No. 10-59780 (Patent Literature 1).

SUMMARY

In the case of an aircraft engine and the like, it is awaited that the ceramic matrix composite has heat resistance of 1400° C. or higher to improve fuel consumption. However, the ceramic matrix composite with a matrix, which has a silicon carbide as a main phase, formed by melt-infiltrating molten silicon as in the related art may have severe deterioration of the material due to oxidation and the like in a high temperature gas flow of 1400° C. or higher, due to residual silicon and the like after the melt infiltration, thereby having reduced heat resistance.

It is thus an object of the present disclosure to provide a ceramic matrix composite capable of further improving heat resistance and a method for manufacturing the same.

A ceramic matrix composite according to the present disclosure includes a substrate which contains a fibrous body formed from a silicon carbide fiber, and a matrix which is formed in the substrate, and which contains $RE_3Al_5O_{12}$, $RE_2Si_2O_7$, and the balance being an oxide of RE, Al, and Si, or $RE_2SiO_5$, where the RE is Y or Yb.

In the ceramic matrix composite according to the present disclosure, the RE may be Yb.

In the ceramic matrix composite according to the present disclosure, when a composition of the matrix is represented by three components of $SiO_2$, $Yb_2O_3$, and $Al_2O_3$, the composition of the matrix may have a composition range surrounded by four points of X1 ($SiO_2$: 66.6 mol %, $Yb_2O_3$: 33.4 mol %, $Al_2O_3$: 0 mol %), X2 ($SiO_2$: 53.5 mol %, $Yb_2O_3$: 16.5 mol %, $Al_2O_3$: 30.0 mol %), X3 ($SiO_2$: 0 mol %, $Yb_2O_3$: 37.5 mol %, $Al_2O_3$: 62.5 mol %), and X4 ($SiO_2$: 50.0 mol %, $Yb_2O_3$: 50.0 mol %, $Al_2O_3$: 0 mol %) in a ternary phase diagram of a $SiO_2$—$Yb_2O_3$—$Al_2O_3$ system in FIG. 2.

In the ceramic matrix composite according to the present disclosure, the matrix may contain $Yb_3Al_5O_{12}$, $Yb_2Si_2O_7$, and the balance being an oxide which contains Yb, Al, and Si, and which have a eutectic composition of $Yb_2Si_2O_7$ and $Al_6Si_2O_{13}$.

In the ceramic matrix composite according to the present disclosure, when a composition of the matrix is represented by three components of $SiO_2$, $Yb_2O_3$, and $Al_2O_3$, the composition of the matrix may have a composition range surrounded by three points of X1 ($SiO_2$: 66.6 mol %, $Yb_2O_3$: 33.4 mol %, $Al_2O_3$: 0 mol %), X2 ($SiO_2$: 53.5 mol %, $Yb_2O_3$: 16.5 mol %, $Al_2O_3$: 30.0 mol %), and X3 ($SiO_2$: 0 mol %, $Yb_2O_3$: 37.5 mol %, $Al_2O_3$: 62.5 mol %) in a ternary phase diagram of a $SiO_2$—$Yb_2O_3$—$Al_2O_3$ system in FIG. 2.

In the ceramic matrix composite according to the present disclosure, the matrix may contain $Yb_3Al_5O_{12}$, $Yb_2Si_2O_7$, and the balance being $Yb_2SiO_5$.

In the ceramic matrix composite according to the present disclosure, when a composition of the matrix is represented by three components of $SiO_2$, $Yb_2O_3$, and $Al_2O_3$, the composition of the matrix may have a composition range surrounded by three points of X1 ($SiO_2$: 66.6 mol %, $Yb_2O_3$: 33.4 mol %, $Al_2O_3$: 0 mol %), X3 ($SiO_2$: 0 mol %, $Yb_2O_3$: 37.5 mol %, $Al_2O_3$: 62.5 mol %), and X4 ($SiO_2$: 50.0 mol %, $Yb_2O_3$: 50.0 mol %, $Al_2O_3$: 0 mol %) in a ternary phase diagram of a $SiO_2$—$Yb_2O_3$—$Al_2O_3$ system in FIG. 2.

A method for manufacturing a ceramic matrix composite according to the present disclosure includes a powder infiltration step of powder-infiltrating a substrate which contains a fibrous body formed from a silicon carbide fiber, with a powder raw material, when a composition of the powder raw material is represented by three components of $SiO_2$, $RE_2O_3$, and $Al_2O_3$, the powder raw material containing at least one component thereof, and a melt infiltration step of melt-infiltrating the substrate that has been powder-infiltrated, with a liquid phase raw material obtained by mixing $RE_2Si_2O_7$ and $Al_6Si_2O_{13}$, by melting the liquid phase raw material by heat treatment at a melting point or higher of the liquid phase raw material, to have a matrix which contains $RE_3Al_5O_{12}$, $RE_2Si_2O_7$, and the balance being an oxide of RE, Al, and Si, or $RE_2SiO_5$, where the RE is Y or Yb.

In the method for manufacturing the ceramic matrix composite according to the present disclosure, the RE may be Yb.

In the method for manufacturing the ceramic matrix composite according to the present disclosure, in the powder infiltration step, the powder raw material may be a $Yb_2SiO_5$ powder.

In the method for manufacturing the ceramic matrix composite according to the present disclosure, in the melt infiltration step, the liquid phase raw material may have a eutectic composition of $Yb_2Si_2O_7$ and $Al_6Si_2O_{13}$, and a heat treatment temperature of the liquid phase raw material may be 1500° C. or higher.

In the method for manufacturing the ceramic matrix composite according to the present disclosure, in the melt infiltration step, the heat treatment temperature of the liquid phase raw material may be 1500 to 1600° C.

In the method for manufacturing the ceramic matrix composite according to the present disclosure, in the melt infiltration step, the heat treatment temperature of the liquid phase raw material may be 1580 to 1600° C., and a contact angle between the substrate that has been powder-infiltrated and the liquid phase raw material may be 25 to 60 degrees.

In the method for manufacturing a ceramic matrix composite according to the present disclosure, the liquid phase raw material may be integrally formed in advance by mixing $RE_2Si_2O_7$ and $Al_6Si_2O_{13}$ and then melting them, before the melt-infiltrating, where the RE is Y or Yb.

The ceramic matrix composite having the above-described configuration and the method for manufacturing the same enable to further improve the heat resistance of the ceramic matrix composite.

DESCRIPTION OF EMBODIMENTS

Figure 1:
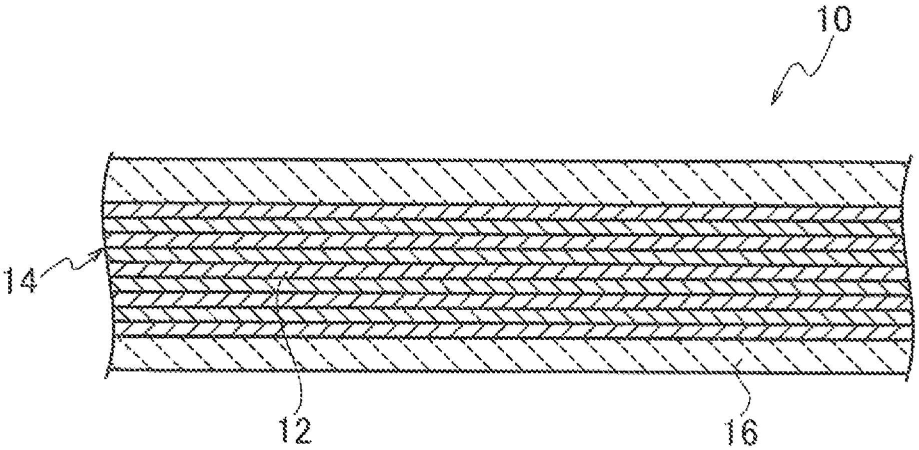
FIG. 1 is a schematic cross-sectional diagram illustrating a configuration of a ceramic matrix composite according to an embodiment of the present disclosure.

An embodiment of the present disclosure is described in detail with reference to the drawings. FIG. 1 is a schematic cross-sectional view of a structure of a ceramic matrix composite 10. The ceramic matrix composite 10 includes a substrate 14 which contains a fibrous body 12 formed from a silicon carbide fiber, and a matrix 16 which is formed in the substrate 14. It is possible to use the ceramic matrix composite 10 for high-pressure turbine components, such as a jet engine turbine blade, and high-temperature components, such as a rocket engine thruster, for example. In high-pressure turbine components needing a large amount of cooling air, providing the ceramic matrix composite 10 with heat resistance of 1400° C. or higher greatly reduces the cooling air.

The substrate 14 contains the fibrous body 12 formed from the silicon carbide fiber (SiC fiber). The substrate 14 has a function of strengthening the ceramic matrix composite 10. As the silicon carbide fiber, a crystalline silicon carbide fiber or an amorphous silicon carbide fiber are usable. As the silicon carbide fiber, the crystalline silicon carbide fiber may be used. The crystalline silicon carbide fiber, which is superior to the amorphous silicon carbide fiber in heat resistance, improves the heat resistance of the ceramic matrix composite 10. As the silicon carbide fiber, it is possible to use continuous fibers, discontinuous fibers, whiskers, and the like.

As the fibrous body 12, it is possible to use a three-dimensional fabric obtained by bundling hundreds to thousands of filaments of the silicon carbide fiber into a fiber bundle and then weaving the fiber bundle in the XYZ directions, for example. As the fibrous body 12, a two-dimensional fabric, such as a plain weave and a satin weave, is usable.

The silicon carbide fiber of the fibrous body 12 may be coated with an interface layer. The interface layer has a function of preventing cracks and the like generated in the matrix 16 from propagating to the silicon carbide fiber. The interface layer may be formed from boron nitride (BN) or the like, which has excellent oxidation resistance. The thickness of the interface layer may be 0.1 μm to 0.5 μm, for example.

The substrate 14 may have a silicon carbide layer provided in gaps among silicon carbide fibers in the fibrous body 12. The silicon carbide layer is capable of protecting the interface layer coating the silicon carbide fiber.

The matrix 16 is formed in the substrate 14 and has a function of supporting the substrate 14. The matrix 16 is formed in gaps and the like in the substrate 14. More specifically, the matrix 16 is formed, for example, in gaps in the fibrous body 12 and pores in the silicon carbide fiber.

The matrix 16 contains $RE_3Al_5O_{12}$, $RE_2Si_2O_7$, and the balance being an oxide of RE, Al, and Si, or $RE_2SiO_5$. The RE is Y (yttrium) or Yb (ytterbium). The matrix 16 is made from only oxides, which improves heat resistance and oxidation resistance of the ceramic matrix composite 10.

$RE_3Al_5O_{12}$ (where RE is Y or Yb) is a complex oxide having a garnet type structure. The complex oxide having the garnet type structure is a high melting point compound, which further improves the heat resistance of the ceramic matrix composite 10.

Moreover, $RE_2Si_2O_7$ (where RE is Y or Yb) is a complex oxide having excellent water vapor resistance. The matrix 16 contains $RE_2Si_2O_7$ (where RE is Y or Yb) having excellent water vapor resistance, which improves the water vapor resistance of the ceramic matrix composite 10.

Note that the oxide of RE, Al, and Si in the balance of the matrix 16 may be a complex oxide of RE, Al, and Si (where RE is Y or Yb). The matrix 16 may also include unavoidable impurities.

In the matrix 16, the RE may be Yb. More specifically, the matrix 16 may contain $Yb_3Al_5O_{12}$, $Yb_2Si_2O_7$, and the balance being an oxide of Yb, Al, and Si, or $Yb_2SiO_5$. Next, as an example of the matrix 16, a case where the RE is Yb is described.

Figure 2:
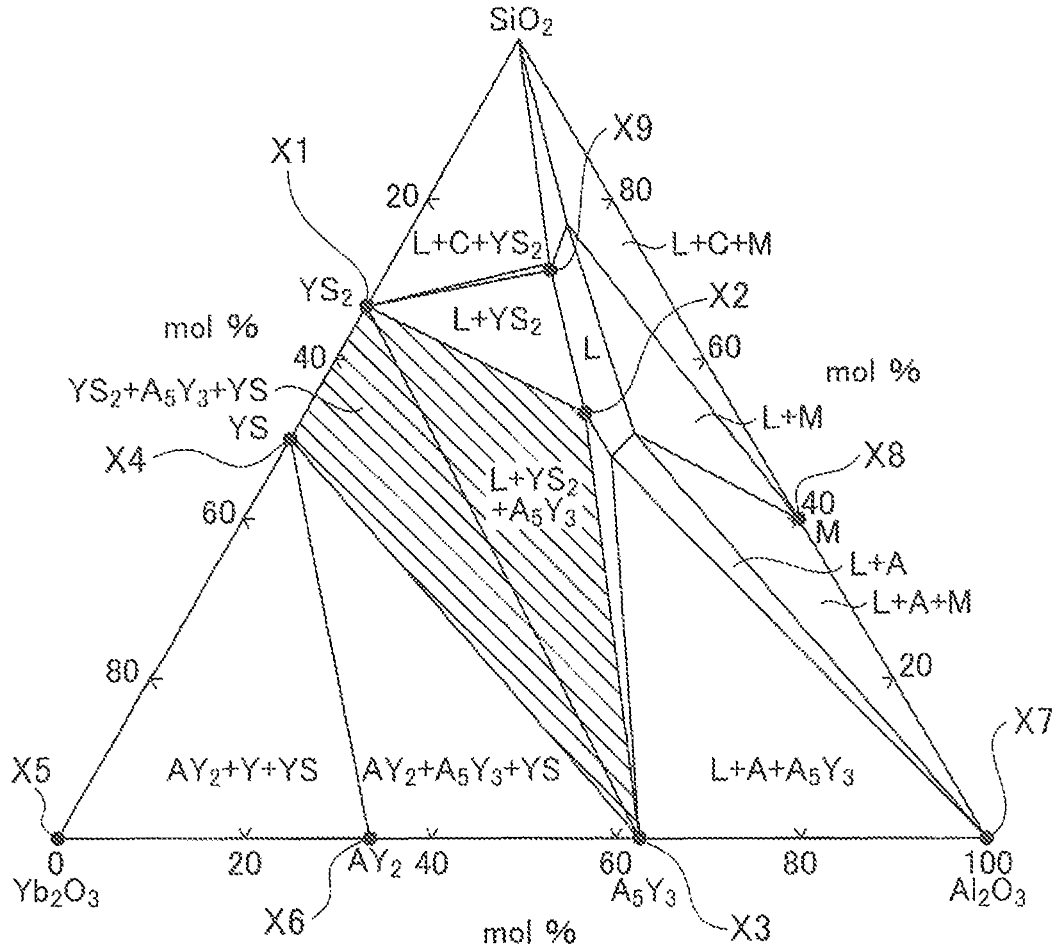
FIG. 2 is a ternary phase diagram of a $SiO_2$—$Yb_2O_3$—$Al_2O_3$ system according to the embodiment of the present disclosure.

When a composition of the matrix 16 is represented by three components of $SiO_2$, $Yb_2O_3$, and $Al_2O_3$, the composition of the matrix 16 is formable by a composition range surrounded by four points of X1 ($SiO_2$: 66.6 mol %, $Yb_2O_3$: 33.4 mol %, $Al_2O_3$: 0 mol %), X2 ($SiO_2$: 53.5 mol %, $Yb_2O_3$: 16.5 mol %, $Al_2O_3$: 30.0 mol %), X3 ($SiO_2$: 0 mol %, $Yb_2O_3$: 37.5 mol %, $Al_2O_3$: 62.5 mol %), and X4 ($SiO_2$: 50.0 mol %, $Yb_2O_3$: 50.0 mol %, $Al_2O_3$: 0 mol %) in a ternary phase diagram of a $SiO_2$—$Yb_2O_3$—$Al_2O_3$ system illustrated in FIG. 2.

FIG. 2 is the ternary phase diagram of the $SiO_2$—$Yb_2O_3$—$Al_2O_3$ system. FIG. 2 illustrates the ternary phase diagram at 1550° C. In FIG. 2, YS represents $Yb_2SiO_5$. $YS_2$ represents $Yb_2Si_2O_7$. Y represents $Yb_2O_3$. $AY_2$ represents $Yb_4Al_2O_9$. $A_5Y_3$ represents $Yb_3Al_5O_{12}$. A represents $Al_2O_3$. M represents $Al_6Si_2O_{13}$. C represents cristobalite ($SiO_2$). L represents a liquid phase.

In FIG. 2, point X1 represents a composition of 66.6 mol % of $SiO_2$, 33.4 mol % of $Yb_2O_3$, and 0 mol % of $Al_2O_3$ and corresponds to $Yb_2Si_2O_7$. Point X2 represents a composition of 53.5 mol % of $SiO_2$, 16.5 mol % of $Yb_2O_3$, and 30.0 mol % of $Al_2O_3$. Point X3 represents a composition of 0 mol % of $SiO_2$, 37.5 mol % of $Yb_2O_3$, and 62.5 mol % of $Al_2O_3$ and corresponds to $Yb_3Al_5O_{12}$. Point X4 represents a composition of 50.0 mol % of $SiO_2$, 50.0 mol % of $Yb_2O_3$, and 0 mol % of $Al_2O_3$ and corresponds to $Yb_2SiO_5$. Point X5 represents a composition of 100 mol % of $Yb_2O_3$. Point X6 represents a composition of 0 mol % of $SiO_2$, 66.6 mol % of $Yb_2O_3$, and 33.4 mol % of $Al_2O_3$ and corresponds to $Yb_4Al_2O_9$. Point X7 represents a composition of 100 mol % of $Al_2O_3$. Point X8 represents a composition of 40.0 mol % of $SiO_2$, 0 mol % of $Yb_2O_3$, and 60.0 mol % of $Al_2O_3$ and corresponds to $Al_6Si_2O_{11}$. Point X9 represents a composition of 71.1 mol % of $SiO_2$, 11.3 mol % of $Yb_2O_3$, and 17.7 mol % of $Al_2O_3$.

When the composition of the matrix 16 is in the composition range surrounded by four points of X1, X2, X3, and X4 in the ternary phase diagram in FIG. 2, the matrix 16 contains $Yb_3Al_5O_{12}$, $Yb_2Si_2O_7$, and the balance being an oxide of Yb, Al, and Si, or $Yb_2SiO_5$.

When the composition of the matrix 16 is in the composition range surrounded by four points of X1, X2, X3, and X4 in the ternary phase diagram in FIG. 2, a generated stress of the matrix 16 due to heat exposure or the like during manufacturing or in the use environment of the ceramic matrix composite 10 is smaller than a rupture stress of the matrix 16. This prevents generation of cracks in the matrix 16 when the ceramic matrix composite 10 is exposed to heat or the like.

In contrast, when the composition of the matrix 16 is in a composition range surrounded by three points of X4, X5, and X6 in the ternary phase diagram in FIG. 2, a generated stress of the matrix 16 is larger than a rupture stress of the matrix 16. Thus, cracks tend to occur in the matrix 16. Similarly, when the composition of the matrix 16 is in a composition range surrounded by three points of X3, X4, and X6 in the ternary phase diagram in FIG. 2, or in a composition range surrounded by three points of X2, X3, and X7, cracks tend to occur in the matrix 16.

More specifically, at the time of heat exposure during manufacturing or in the use environment of the ceramic matrix composite 10, a generated stress that is from a thermal stress due to a difference in thermal expansion between the matrix 16 and the substrate 14 containing the fibrous body 12 occurs in the matrix 16. When the generated stress of the matrix 16 becomes larger than a fracture stress of the matrix 16, cracks tend to occur in the matrix 16. The generated stress of the matrix 16 tends to be the greatest at the time of matrix formation because a heat treatment temperature, which is a temperature of melt infiltration in a melt infiltration step (S12) described later, tends to be the highest temperature to which the matrix 16 is exposed. Making the generated stress of the matrix 16 smaller than the rupture stress of the matrix 16 prevents the generation of cracks in the matrix 16. Since the crack in the matrix 16 becomes an oxygen penetration path, prevention of the generation of cracks in the matrix 16 prevents the silicon carbide fiber and the like from being oxidized.

Further, when the composition of the matrix 16 is in the composition range surrounded by four points of X1, X2, X3, and X4 in the ternary phase diagram in FIG. 2, generation of an excessive amount of the liquid phase is prevented when the matrix 16 is formed by melt infiltration in the melt infiltration step (S12) described later, so that the matrix 16 is formable. For example, when the composition of the matrix 16 is in a composition range surrounded by three points of X1, X2, and X9 in the ternary phase diagram in FIG. 2, the excessive amount of liquid phase is generated when the matrix is formed by melt infiltration, so that it becomes difficult to retain the shape and to form the matrix 16.

When represented by three components of $SiO_2$, $Yb_2O_3$, and $Al_2O_3$, the composition of the matrix 16 may be in a composition range surrounded by three points of X1, X2, and X3 in the ternary phase diagram of the $SiO_2$—$Yb_2O_3$—$Al_2O_3$ system in FIG. 2. When the matrix 16 is in this composition range, the matrix 16 contains $Yb_3Al_5O_{12}$, $Yb_2Si_2O_7$, and the balance being an oxide of Yb, Al, and Si. The oxide of Yb, Al, and Si in the balance is made from an oxide composition of point X2 ($SiO_2$: 53.5 mol %, $Yb_2O_3$: 16.5 mol %, $Al_2O_3$: 30.0 mol %) of the ternary phase diagram in FIG. 2. The oxide of Yb, Al, and Si in the balance forms a liquid phase at 1500° C. or higher.

Figure 3:
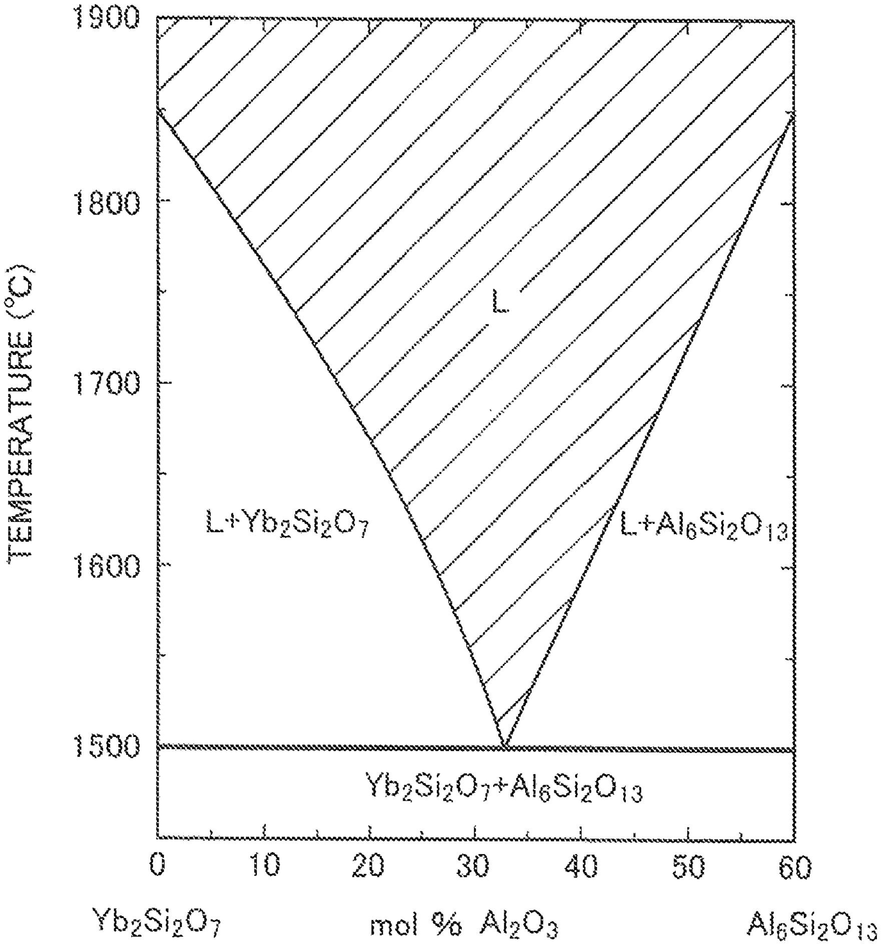
FIG. 3 is a pseudo-binary phase diagram of a $Yb_2Si_2O_7$—$Al_6Si_2O_{13}$ system according to the embodiment of the present disclosure.

More specifically, FIG. 3 is a pseudo-binary phase diagram of a $Yb_2Si_2O_7$—$Al_6Si_2O_{13}$ system. The pseudo-binary phase diagram of FIG. 3 corresponds to a composition on a straight line connecting points X1, X2, and X8 of the ternary phase diagram in FIG. 2. A eutectic composition of $Yb_2Si_2O_7$ and $Al_6Si_2O_{13}$ corresponds to an oxide composition of point X2 in the ternary phase diagram in FIG. 2. Thus, the oxide of Yb, Al, and Si in the balance is made from the eutectic composition of $Yb_2Si_2O_7$ and $Al_6Si_2O_{13}$. From the pseudo-binary phase diagram in FIG. 3, a eutectic temperature of $Yb_2Si_2O_7$ and $Al_6Si_2O_{13}$ is 1500° C., and thus the oxide of Yb, Al, and Si in the balance forms a liquid phase at 1500° C. or higher. When the matrix 16 is formed, the oxide of Yb, Al, and Si in the balance forms an appropriate liquid phase, which increases the fixing force of the matrix 16. As a result, the rupture stress of the matrix 16 becomes larger, which improves the mechanical strength of the ceramic matrix composite 10.

When represented by three components of $SiO_2$, $Yb_2O_3$, and $Al_2O_3$, the composition of the matrix 16 may be in a composition range surrounded by three points of X1, X3, and X4 in the ternary phase diagram of the $SiO_2$—$Yb_2O_3$—$Al_2O_3$ system in FIG. 2. When the composition range of the matrix 16 is in this composition range, the matrix 16 contains $Yb_3Al_5O_{12}$, $Yb_2Si_2O_7$, and the balance being $Yb_2SiO_5$. $Yb_2SiO_5$ is an oxide having excellent water vapor resistance, which further improves the water vapor resistance of the ceramic matrix composite 10.

Figure 4:
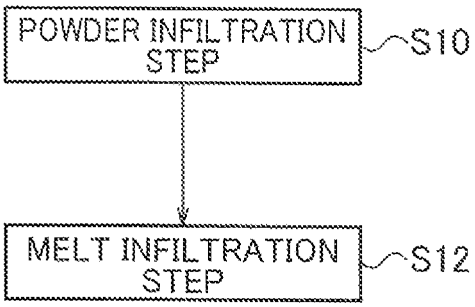
FIG. 4 is a flow chart illustrating a method for manufacturing the ceramic matrix composite according to the embodiment of the present disclosure.

Next, a method for manufacturing the ceramic matrix composite 10 is described. FIG. 4 is a flowchart illustrating a method for manufacturing the ceramic matrix composite 10. The method for manufacturing the ceramic matrix composite 10 includes a powder infiltration step (S10) and a melt infiltration step (S12).

Figure 5:
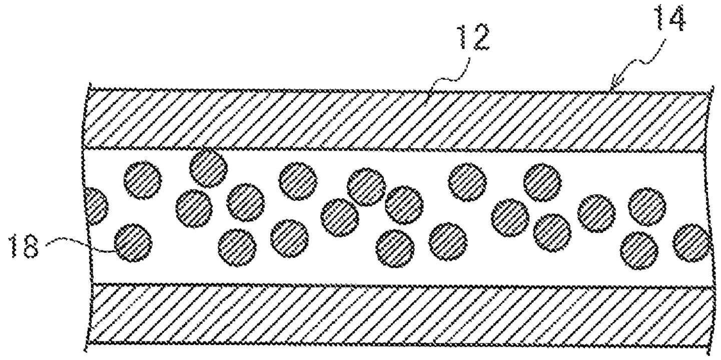
FIG. 5 is a schematic diagram illustrating a powder infiltration step (S10) according to the embodiment of the present disclosure.

The powder infiltration step (S10) is a step of powder-infiltrating the substrate 14 which contains the fibrous body 12 formed from the silicon carbide fiber, with a powder raw material containing, when a composition of the powder raw material is represented by three components of $SiO_2$, $RE_2O_3$, and $Al_2O_3$, at least one component thereof. The RE is Y (yttrium) or Yb (ytterbium). FIG. 5 is a schematic diagram for illustrating the powder infiltration step (S 10).

First, the substrate 14 is described. The fibrous body 12 contained in the substrate 14 is formed from the silicon carbide fiber. The fibrous body 12 is made from a preform, such as a two-dimensional fabric or a three-dimensional fabric. As the crystalline silicon carbide fiber, for example, Hi-Nicalon Type S (Nippon Carbon Co., Ltd.), Tyranno Fiber SA Grade (Ube Industries, Ltd.), and the like are usable. As the amorphous silicon carbide fiber, for example, Hi-Nicalon (Nippon Carbon Co., Ltd.), Tyranno Fiber ZMI Grade (Ube Industries, Ltd.) and the like are usable. The silicon carbide fiber may be coated with an interface layer formed from boron nitride (BN) or the like. Coating of the interface layer may be performed by chemical vapor deposition (CVD method), for example.

Before performing the powder infiltration step (S10), the substrate 14 may have a silicon carbide layer formed among silicon carbide fibers of the fibrous body 12 by chemical vapor phase infiltration (CVI method). For example, the silicon carbide layer is formable among silicon carbide fibers by setting and heating the fibrous body 12 in a reaction furnace (reaction temperature: 900 to 1000° C.) and using methyltrichlorosilane ($CH_3SiCl_3$) or the like as a reaction gas.

Next, a powder infiltration method of the powder raw material 18 is described. First, the powder raw material 18 is described. When the powder raw material 18 is represented by three components of $SiO_2$, $RE_2O_3$, and $Al_2O_3$, the powder raw material 18 is made from at least one component thereof. When represented by three components of $SiO_2$, $RE_2O_3$, and $Al_2O_3$, the powder raw material 18 may be made from one component or may be made from two or three components. When the powder raw material 18 is made from one component, $SiO_2$ powder, $RE_2O_3$ powder, or $Al_2O_3$ powder is usable.

When the powder raw material 18 is made from two or three components, a mixed powder in which each component is mixed may be used, or a complex oxide powder in which each component is combined together may be used. For example, when the powder raw material 18 is made from two components of $SiO_2$ and $RE_2O_3$, a mixed powder of $SiO_2$ powder and $RE_2O_3$ powder, or a complex oxide powder, such as $RE_2SiO_5$ powder, may be used as the powder raw material 18. When the RE is Yb, and the powder raw material 18 is made from two components of $SiO_2$ and $Yb_2O_3$, a mixed powder of $SiO_2$ powder and $Yb_2O_3$ powder, or a complex oxide powder, such as $Yb_2SiO_5$ powder, may be used as the powder raw material 18.

For example, when the powder raw material 18 is made from three components of $SiO_2$, $RE_2O_3$, and $Al_2O_3$, a mixed powder of $SiO_2$ powder, $RE_2O_3$ powder, and $Al_2O_3$ powder, or a complex oxide powder in which each component is combined may be used, as the powder raw material 18. When the RE is Yb, and the powder raw material 18 is made from three components of $SiO_2$, $Yb_2O_3$, and $Al_2O_3$, a mixed powder of $SiO_2$ powder, $Yb_2O_3$ powder, and $Al_2O_3$ powder, or a complex oxide powder in which each component is combined may be used.

The particle size of the powder in the powder raw material 18 may be 3 μm or more and 5 μm or less in average particle size. This is because when the particle size of the powder is smaller than 3 μm in the average particle size, the powder tends to aggregate together in a slurry described later, and it becomes difficult to dissolve the aggregation when ultrasonic vibration is applied to the slurry. Moreover, this is because when the average particle size of the powder is larger than 5 μm, a filling factor of the powder in vacant spaces of the fibrous body 12 may decrease. Note that the average particle size is, for example, a particle size (median diameter) at which an accumulated value becomes 50% when the results of the particle size distribution are accumulated from the smallest to the largest using the particle size distribution of particles measured by the laser diffraction/scattering method.

The powder infiltration of the powder raw material 18 may be performed by solid phase infiltration. The solid phase infiltration enables to increase the filling factor of the substrate 14 with the powder raw material 18. Next, a case of powder infiltrating the powder raw material 18 by solid phase infiltration is described as an example. First, a dispersion medium, such as ethanol, methanol, or acetone, and the powder raw material 18 are put into a container and mixed to produce a slurry.

The slurry in the container is evacuated for defoaming. Defoaming of the slurry removes air bubbles and the like in the slurry. This prevents air bubbles and the like from getting caught when the powder raw material 18 is filled in vacant spaces of the fibrous body 12. It is possible to use a general vacuum pump or the like for evacuation. After defoaming the slurry, evacuation is stopped to open to the atmosphere.

Next, the substrate 14 is put into the container and immersed in the slurry. The substrate 14 is made to be standing in a state of being immersed in the slurry. Standing time may be between 30 and 60 minutes. Standing makes the powder raw material 18 precipitated in the slurry, which enhances the filling factor of the powder raw material 18 in vacant spaces of the fibrous body 12.

After standing, ultrasonic vibration is applied by an ultrasonic vibrator to the slurry in which the substrate 14 is immersed. The ultrasonic vibration is mainly propagated to the powder raw material 18 through a dispersion medium, such as ethanol. This disentangles the aggregation of the powder raw material 18 and thus increases the filling factor of the powder raw material 18 in vacant spaces of the fibrous body 12. The frequency of the ultrasonic vibration may be 23 kHz or more and 28 kHz or less. When the frequency of the ultrasonic vibration is lower than 23 kHz, it becomes difficult to disentangle the aggregation of the powder raw material 18, and the filling factor of the powder raw material 18 tends to decrease. When the frequency of the ultrasonic vibration is higher than 28 kHz, the vibration of the powder raw material 18 becomes larger, and it becomes difficult for the powder raw material 18 to be filled in vacant spaces of the fibrous body 12. The output of the ultrasonic wave may be 600 W, for example. The vibration time of the ultrasonic vibration may be 10 minutes or more and 15 minutes or less. It is possible to use a general ultrasonic vibrator for the ultrasonic vibrator. After the ultrasonic vibration is applied, the substrate 14 is taken out from the slurry and dried. As described above, the substrate 14 is filled with the powder raw material 18.

Figure 6:
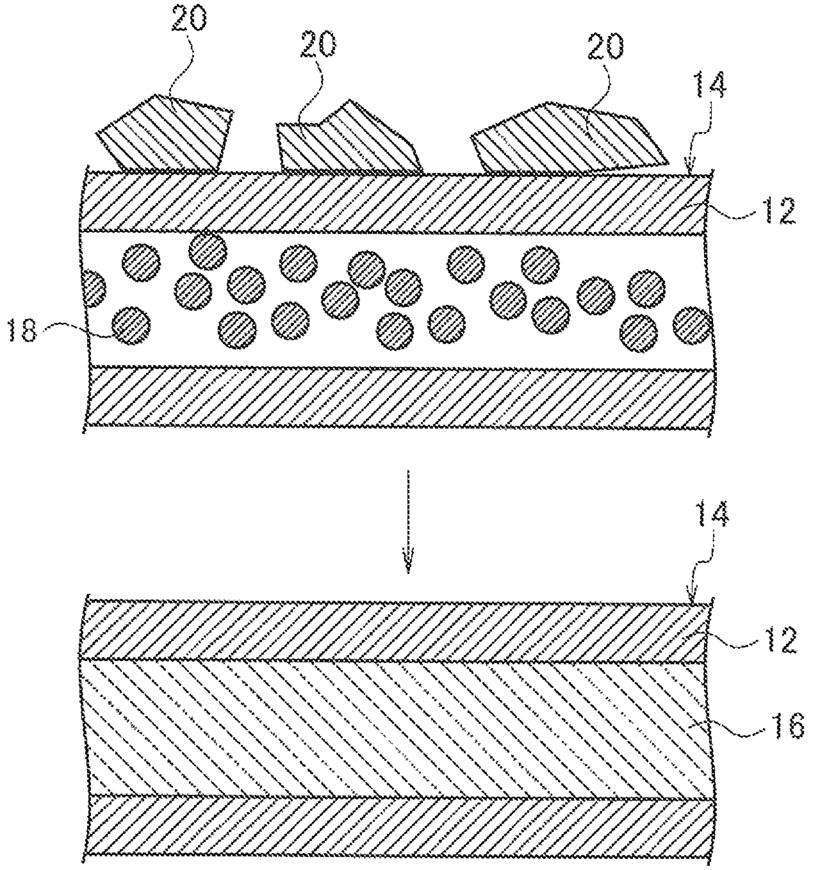
FIG. 6 is a schematic diagram illustrating a melt infiltration step (S12) according to the embodiment of the present disclosure.

The melt infiltration step (S12) is a step of melt-infiltrating a liquid phase raw material obtained by mixing $RE_2Si_2O_7$ and $Al_6Si_2O_{13}$, into the substrate 14 that has been powder-infiltrated, by melting the liquid phase raw material by heat treatment at the melting point of the liquid phase raw material or higher, to obtain the matrix 16 that contains $RE_3Al_5O_{12}$, $RE_2Si_2O_7$, and the balance being an oxide of RE, Al, and Si, or $RE_2SiO_5$. The RE is Y (yttrium) or Yb (ytterbium). FIG. 6 is a schematic diagram illustrating the melt infiltration step (S12).

First, a liquid phase raw material 20 is formed by mixing $RE_2Si_2O_7$ and $Al_6Si_2O_{13}$. As the liquid phase raw material 20, a mixed powder obtained by mixing $RE_2Si_2O_7$ powder and $Al_6Si_2O_{13}$ powder in a predetermined ratio is usable. The liquid phase raw material 20 may be integrally formed into grains or the like in advance by mixing $RE_2Si_2O_7$ and $Al_6Si_2O_{13}$ and then melting them, before melt-infiltrating.

$RE_2Si_2O_7$ and $Al_6Si_2O_{13}$ are eutectic reaction type oxides. Since the melting point of the eutectic composition is lower than each of the melting points of $RE_2Si_2O_7$ and $Al_6Si_2O_{13}$, it is possible to set the heat treatment temperature lower. The liquid phase raw material 20 melted by heat treatment flows into gaps in the fibrous body 12 of the substrate 14 and gaps in the powder raw material 18 to be melt-infiltrated. Then, the liquid phase raw material 20 that has been melted and the powder raw material 18 react to form the matrix 16 containing $RE_3Al_5O_{12}$, $RE_2Si_2O_7$, and the balance being an oxide of RE, Al, and Si, or $RE_2SiO_5$.

Next, a case where the RE is Yb is described as an example. First, a liquid phase raw material 20 is formed by mixing $Yb_2Si_2O_7$ and $Al_6Si_2O_{13}$. As illustrated in FIG. 3, $Yb_2Si_2O_7$ and $Al_6Si_2O_{13}$ are eutectic reaction type oxides, and the eutectic temperature is 1500° C.

As the liquid phase raw material 20, a mixed powder obtained by mixing $Yb_2Si_2O_7$ powder and $Al_6Si_2O_{13}$ powder in a predetermined ratio is usable. The liquid phase raw material 20 may be integrally formed in advance by melting a mixed powder obtained by mixing $Yb_2Si_2O_7$ powder and $Al_6Si_2O_{13}$ powder in a predetermined ratio, before melt-infiltrating.

The liquid phase raw material 20 may be a eutectic composition of $Yb_2Si_2O_7$ and $Al_6Si_2O_{13}$. When represented by three components of $SiO_2$, $Yb_2O_3$, and $Al_2O_3$, the eutectic composition of $Yb_2Si_2O_7$ and $Al_6Si_2O_{13}$ can be a composition of X2 point ($SiO_2$: 53.5 mol %, $Yb_2O_3$: 16.5 mol %, $Al_2O_3$: 30.0 mol %) in the ternary phase diagram in FIG. 2. Since the melting point of the eutectic composition is lower than each of the melting points of $Yb_2Si_2O_7$ and $Al_6Si_2O_{13}$, it is possible to set the heat treatment temperature lower. This enables to improve the productivity of the melt infiltration process (S12) and to reduce the production cost. Grain coarsening of the silicon carbide fiber is also prevented, which prevents the mechanical strength of the ceramic matrix composite 10 from dropping.

The liquid phase raw material 20 may be made from not only the eutectic composition of $Yb_2Si_2O_7$ and $Al_6Si_2O_{13}$, but also a composition in the vicinity of the eutectic composition. Since the composition in the vicinity of the eutectic composition has the melting point lower than each of the melting points of $Yb_2Si_2O_7$ and $Al_6Si_2O_{13}$, it is possible to set the heat treatment temperature lower.

After the liquid phase raw material 20 is arranged on the substrate 14 that has been powder-infiltrated, heat treatment is performed at a melting point of the liquid phase raw material 20 or higher. The substrate 14 that has been powder-infiltrated is powder-infiltrated with the powder raw material 18, such as $Yb_2SiO_5$ powder, or a mixed powder of $SiO_2$ powder, $Yb_2O_3$ powder, and $Al_2O_3$ powder. The liquid phase raw material 20 may be disposed, for example, on the upper side of the substrate 14 that has been powder-infiltrated.

When the liquid phase raw material 20 is made from the eutectic composition of $Yb_2Si_2O_7$ and $Al_6Si_2O_{13}$, the heat treatment is performable at a heat treatment temperature of 1500° C. or higher. This is because the liquid phase raw material 20 does not melt when the heat treatment temperature is lower than 1500° C. The heat treatment may be performed at a heat treatment temperature of 1500 to 1600° C. This is because when the heat treatment temperature is higher than 1600° C., the silicon carbide fiber tends to be thermally deteriorated, and the mechanical strength, such as fatigue strength, of the ceramic matrix composite 10 may decrease. The heat treatment time may be from 30 minutes to 10 hours, for example.

The heat treatment temperature may be 1580 to 1600° C. When heat treatment is performed at this heat treatment temperature, wettability between the substrate 14 that has been powder-infiltrated and the liquid phase raw material 20 is improved. More specifically, when the heat treatment temperature is lower than 1580° C., a contact angle (wetting angle) between the powder-infiltrated substrate 14 and the liquid phase raw material 20 is about 70 degrees. In contrast, when the heat treatment temperature is 1580 to 1600° C., the contact angle between the powder-infiltrated substrate 14 and the liquid phase raw material 20 is 25 to 60 degrees. When the contact angle between the powder-infiltrated substrate 14 and the liquid phase raw material 20 reduces, and the wettability is improved, the liquid phase raw material 20 is easily melt-infiltrated into the powder-infiltrated substrate 14, which enhances the filling factor of the matrix 16.

The heat treatment temperature may be 1590 to 1600° C. When the heat treatment is performed at this heat treatment temperature, the contact angle between the powder-infiltrated substrate 14 and the liquid phase raw material 20 is 25 to 45 degrees. As a result, the wettability between the powder-infiltrated substrate 14 and the liquid phase raw material 20 is further improved, so that the powder-infiltrated substrate 14 is easily melt-infiltrated with the liquid phase raw material 20, which further enhances the filling factor of the matrix 16. The heat treatment temperature may be 1600° C. By setting the heat treatment temperature to 1600° C., the contact angle between the powder-infiltrated substrate 14 and the liquid phase raw material 20 becomes 25 degrees. This further improves the wettability between the powder-infiltrated substrate 14 and the liquid phase raw material 20.

Regarding heat treatment atmosphere, the treatment may be performed in a vacuum or in an inert gas atmosphere, such as argon gas, to prevent oxidation of the silicon carbide fiber or the like. Regarding pressurization during melt infiltration, pressurization may be performed, or atmospheric pressure may be used without pressurization. As heat treatment equipment, general equipment, such as a vacuum heat treatment furnace, an atmosphere heat treatment furnace, a hot press apparatus, or a HIP apparatus, is usable.

The liquid phase raw material 20 that has been melted by heat treatment flows into gaps in the fibrous body 12 of the substrate 14 and gaps in the powder raw material 18 to be melt-infiltrated. Then, the molten liquid phase raw material 20 and the powder raw material 18 react with each other to form the matrix 16 containing $Yb_3Al_5O_{12}$, $Yb_2Si_2O_7$, and the balance being an oxide of Yb, Al, and Si, or $Yb_2SiO_5$.

For example, when $Yb_2SiO_5$ powder is used for the powder raw material 18, and the eutectic composition of $Yb_2Si_2O_7$ and $Al_6Si_2O_{13}$ or a composition in the vicinity of the eutectic composition is used for the liquid phase raw material 20, the $Yb_2SiO_5$ powder corresponding to the composition of point X4 in the ternary phase diagram in FIG. 2 and the liquid phase raw material 20 corresponding to the composition of point X2 or in the vicinity of point X2 in the ternary phase diagram in FIG. 2 react to form the matrix 16. Thus, the matrix 16 is formed by a composition range surrounded by the points X1, X2, X3, and X4 in the ternary phase diagram in FIG. 2. When the $Yb_2SiO_5$ powder is used for the powder raw material 18, and the eutectic composition of $Yb_2Si_2O_7$ and $Al_6Si_2O_{13}$ is used for the liquid phase raw material 20, the matrix 16 is formed from an oxide corresponding to a composition on a line connecting the points X2 and X4 in the ternary phase diagram in FIG. 2.

For example, when the $Yb_2SiO_5$ powder is used for the powder raw material 18, and the eutectic composition of $Yb_2Si_2O_7$ and $Al_6Si_2O_{13}$ or a composition close to the eutectic composition is used for the liquid phase raw material 20, the matrix 16 is formable from an oxide having a composition range surrounded by the points X1, X2, and X3 or an oxide having a composition range surrounded by the points X1, X3, and X4 in the ternary phase diagram in FIG. 2, by adjusting the ratio of the liquid phase raw material 20 and the $Yb_2SiO_5$ powder. When the matrix 16 is formed from an oxide having the composition range surrounded by the points X1, X2, and X3 in the ternary phase diagram in FIG. 2, the liquid phase raw material 20 is made larger than the $Yb_2SiO_5$ powder. When the matrix 16 is formed from an oxide having the composition range surrounded by the points X1, X3, and X4 in the ternary phase diagram in FIG. 2, the $Yb_2SiO_5$ powder is made larger than the liquid phase raw material 20. In this way, the ceramic matrix composite 10 is manufacturable.

The ceramic matrix composite 10 may be coated with an environmental resistant coating. As the environment resistant coating, the surface of the ceramic matrix composite 10 is coated with a mixed layer in which $Yb_2SiO_5$ and $Al_6Si_2O_{13}$ are mixed, and the surface of the mixed layer is coated with an $HfO_2$ layer, for example. When the mixed layer of $Yb_2SiO_5$ and $Al_6Si_2O_{13}$ is coated on the surface of the ceramic matrix composite 10, the matrix 16 may contain $Yb_3Al_5O_{12}$, $Yb_2Si_2O_7$, and the balance being an oxide of Yb, Al, and Si, or $Yb_2SiO_5$. This improves the adhesion between the ceramic matrix composite 10 and the mixed layer.

The ceramic matrix composite having the above-described structure includes a substrate which contains a fibrous body formed from a silicon carbide fiber, and a matrix which is formed in the substrate, and which contains $RE_3Al_5O_{12}$, $RE_2Si_2O_7$, and the balance being an oxide of RE, Al, and Si, or $RE_2SiO_5$ (where RE is Y or Yb). The matrix is formed only from oxides, which improves the heat resistance of the ceramic matrix composite. Since the matrix is formed only from oxides, the ceramic matrix composite having the above-described structure is prevented from expanding in volume due to oxidation of the matrix even when exposed to a high temperature gas flow of 1400° C. or higher. Thus, the generation of cracks in the matrix is reduced, which prevents oxidation and steam deterioration and the like of the silicon carbide fiber.

EXAMPLES (Matrix Evaluation Test)

Figure 7:
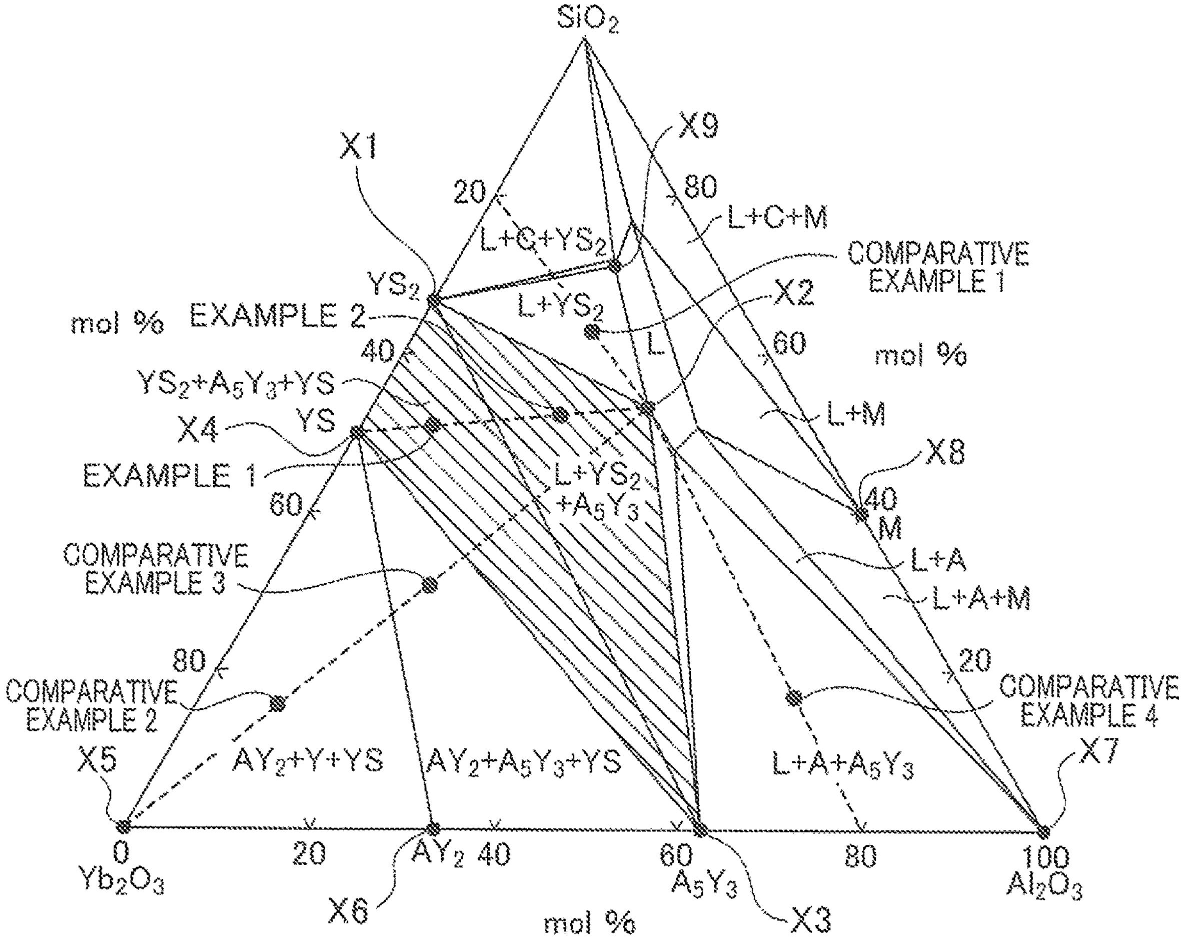
FIG. 7 is a diagram illustrating a component composition of each specimen according to the embodiment of the present disclosure.

Matrix evaluation for the ceramic matrix composite was performed. First, a specimen for evaluating the matrix is described. Six kinds of specimens for examples 1 to 2 and comparative examples 1 to 4 were made. FIG. 7 is a diagram illustrating a component composition of each specimen. In FIG. 7, the composition of each specimen is added to the ternary phase diagram of the $SiO_2$—$Yb_2O_3$—$Al_2O_3$ system in FIG. 2.

In the ternary phase diagram in FIG. 2, example 1 represents a composition range surrounded by three points of X1, X3, and X4. Example 1 contains $Yb_3Al_5O_{12}$, $Yb_2Si_2O_7$, and the balance being $Yb_2SiO_5$. When represented by three components of $SiO_2$, $Yb_2O_3$, and $Al_2O_3$, the composition of example 1 was 51.1 mol % of $SiO_2$, 40.9 mol % of $Yb_2O_3$, and 8.0 mol % of $Al_2O_3$.

Example 2 represents a composition range surrounded by three points of X1, X2, and X3 in the ternary phase diagram in FIG. 2. Example 2 contains $Yb_3Al_5O_{12}$, $Yb_2Si_2O_7$, and the balance being an oxide of Yb, Al, and Si. The oxide of Yb, Al, and Si in the balance is made from a composition of point X2 in the ternary phase diagram in FIG. 2 and has a eutectic composition of $Yb_2Si_2O_7$ and $Al_6Si_2O_{13}$. When represented by three components of $SiO_2$, $Yb_2O_3$, and $Al_2O_3$, the composition of example 2 was 52.4 mol % of $SiO_2$, 30.5 mol % of $Yb_2O_3$, and 17.1 mol % of $Al_2O_3$.

Comparative example 1 represents a composition range surrounded by three points of X1, X2, and X9 in the ternary phase diagram in FIG. 2. Comparative Example 1 was made from $Yb_2Si_2O_7$, and an oxide of Yb, Al, and Si, the oxide having a composition of points X2 and X9 in the ternary phase diagram in FIG. 2. When represented by three components of $SiO_2$, $Yb_2O_3$, and $Al_2O_3$, the composition of comparative example 1 was 64.6 mol % of $SiO_2$, 21.0 mol % of $Yb_2O_3$, and 14.1 mol % of $Al_2O_3$.

Comparative example 2 represents a composition range surrounded by three points of X4, X5, and X6 in the ternary phase diagram in FIG. 2. Comparative example 2 was made from $Yb_4Al_2O_4$, $Yb_2O_3$, and $Yb_2SiO_5$. When represented by three components of $SiO_2$, $Yb_2O_3$, and $Al_2O_3$, the composition of comparative example 2 was 16.4 mol % of $SiO_2$, 73.5 mol % of $Yb_2O_3$, and 10.1 mol % of $Al_2O_3$.

Comparative example 3 represents a composition range surrounded by three points of X3, X4, and X6 in the ternary phase diagram in FIG. 2. Comparative Example 3 was made from $Yb_4Al_2O_9$, $Yb_3Al_5O_{12}$, and $Yb_2SiO_5$. When represented by three components of $SiO_2$, $Yb_2O_3$, and $Al_2O_3$, the composition of comparative example 3 was 29.8 mol % of $SiO_2$, 51.7 mol % of $Yb_2O_3$, and 18.5 mol % of $Al_2O_3$.

Comparative example 4 represents a composition range surrounded by three points of X2, X3, and X7 in the ternary phase diagram in FIG. 2. Comparative example 4 was made from $Al_2O_3$, $Yb_3Al_5O_{12}$, and an oxide of Yb, Al, and Si having a composition of point X2 in the ternary phase diagram in FIG. 2. When represented by three components of $SiO_2$, $Yb_2O_3$, and $Al_2O_3$, the composition of comparative example 4 was 18.1 mol % of $SiO_2$, 18.5 mol % of $Yb_2O_3$, and 63.4 mol % of $Al_2O_3$.

Next, a method of making each specimen is described. For each specimen, a powder raw material made from a mixed powder of $Yb_2O_3$ powder, $SiO_2$ powder, and $Al_2O_3$ powder, and a liquid phase raw material obtained by mixing $Yb_2Si_2O_7$ and $Al_6Si_2O_{13}$ were mixed to be a component composition of each specimen. The liquid phase raw material was a eutectic composition of $Yb_2Si_2O_7$ and $Al_6Si_2O_{13}$ and was adjusted to have a composition of point X2 in the ternary phase diagram in FIG. 2. Each specimen was made by reaction-sintering a mixture of the powder raw material and the liquid phase raw material by heating and pressurizing in a hot press. The heating condition was maintained at 1600° C. for 1 hour. The pressure condition was 20 MPa. The atmosphere condition was argon gas atmosphere. The shape of the specimen was rectangular. It was possible to make specimens of examples 1 to 2 and comparative examples 2 to 4. In comparative example 1, the amount of the liquid phase was too large to hold the shape, and thus it was impossible to make the specimen.

Next, each specimen was used to evaluate a generated stress of the matrix. To evaluate the generated stress of the matrix, a thermal expansion measurement and a bending test were performed on each specimen. The thermal expansion measurement was performed in the range of room temperature to 1400° C. In the bending test, a modulus of elasticity and a rupture stress were measured at room temperature. The bending test was a four-point bending test and performed in accordance with JIS R1601. The generated stress $\sigma$ of the matrix was calculated from $\sigma=E\times(\alpha_c-\alpha_m)\times\Delta T$. E is a modulus of elasticity of the matrix. $\alpha_c$ is a coefficient of thermal expansion (CTE) of the ceramic matrix composite (CMC). $\alpha_m$ is a coefficient of thermal expansion (CTE) of the matrix. $\Delta T$ is a difference in temperature. AT was set to 1500° C. assuming the heat treatment temperature during melt infiltration.

Figure 8:
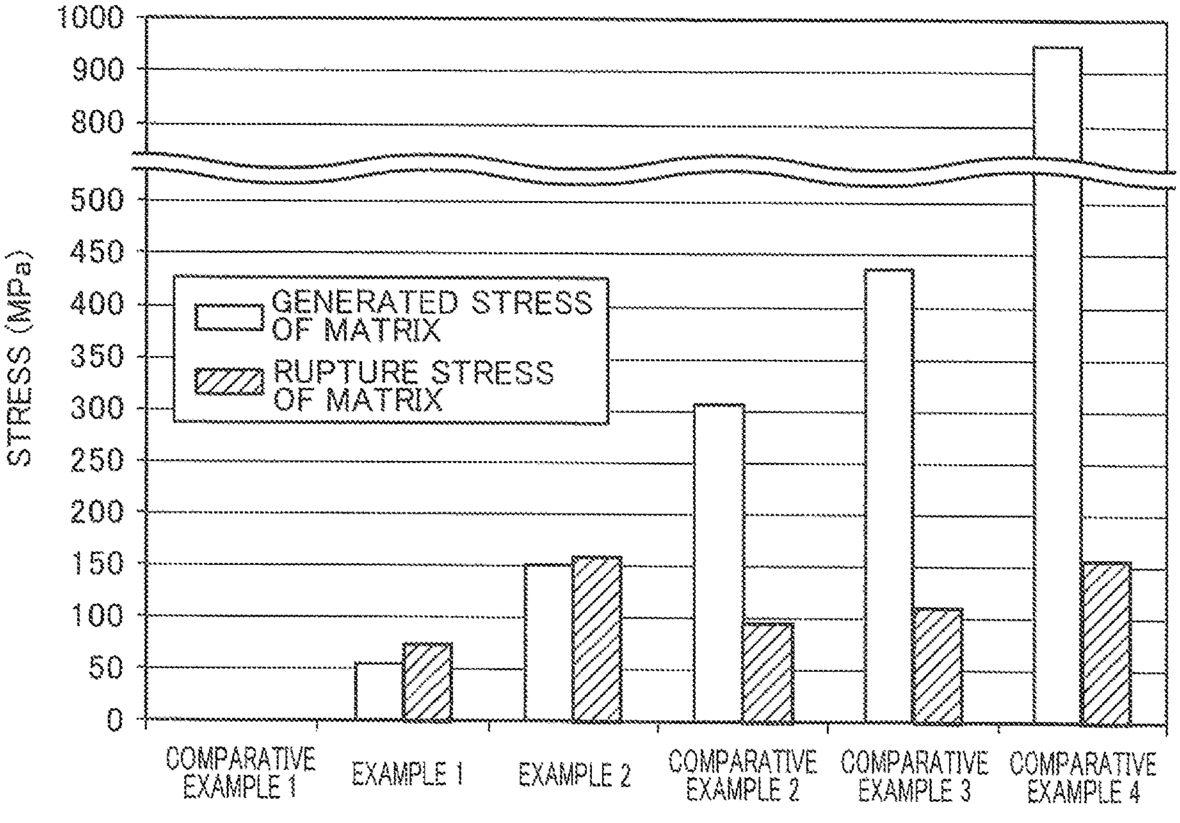
FIG. 8 is a graph illustrating a relationship between a rupture stress of a matrix and a generated stress of the matrix when each specimen is used as the matrix according to the embodiment of the present disclosure.

Table 1 shows the generated stress of the matrix when each specimen is used as the matrix. FIG. 8 is a graph illustrating a relationship between the rupture stress of the matrix and the generated stress of the matrix when each specimen is used as the matrix. Note that in comparative example 1, the specimen could not be made, and thus the generated stress of the matrix was not evaluated. Respective data of the ceramic matrix composite (CMC) are those measured using the ceramic matrix composite of example 3 described below.

TABLE 1

| | CTE (1400° C.) | MODULUS OF ELASTICITY E (GPa) | TEMPERATURE DIFFERENCE ΔT (° C.) | RUPTURE STRESS σ (MPa) | GENERATED STRESS OF MATRIX σ (1500° C.~RT) (MPa) |
|---|---|---|---|---|---|
| CMC | 3.93E−06 | 102 | 1500 | 433 | — |
| COMPARATIVE EXAMPLE 1 | — | — | — | — | — |
| EXAMPLE 1 | 4.60E−06 | 55 | 1500 | 73 | 56 |
| EXAMPLE 2 | 5.01E−06 | 92 | 1500 | 159 | 150 |
| COMPARATIVE EXAMPLE 2 | 6.78E−06 | 72 | 1500 | 95 | 307 |
| COMPARATIVE EXAMPLE 3 | 7 62E−06 | 79 | 1500 | 110 | 435 |
| COMPARATIVE EXAMPLE 4 | 9.37E−06 | 115 | 1500 | 155 | 938 |

In examples 1 to 2, the generated stress of the matrix was smaller than the rupture stress of the matrix. This indicates that using examples 1 to 2 for the matrix prevents the occurrence of cracks in the matrix and formation of oxygen penetration paths (oxygen path). In contrast, in comparative examples 2 to 4, the generated stress of the matrix was larger than the rupture stress of the matrix. This indicates that using comparative examples 2 to 4 for the matrix tends to generate cracks in the matrix and to form oxygen penetration paths (oxygen paths).

The rupture stress of the matrix in example 2 was larger than that in example 1. The reason for this is considered to be that in example 2, $Yb_2Si_2O_7$ and $Yb_3Al_5O_{12}$ were more firmly fixed each other because a liquid phase of the oxide of Yb, Al, and Si in the balance was formed during pressure-sintering when the specimen is made.

(Melt Infiltration Evaluation Test)

An evaluation test of melt infiltration in the matrix was performed. First, a test method is described. A preform made from a fabric formed from the silicon carbide fiber was used for the substrate. This preform was powder-infiltrated with $Yb_2SiO_5$ powder as the powder raw material by solid phase infiltration. The wettability of the powder-infiltrated substrate and the liquid phase raw material obtained by mixing $Yb_2SiO_7$ and $Al_6Si_2O_{13}$ was evaluated by the contact angle θ/2 method. The liquid phase raw material was set as a eutectic composition of $Yb_2Si_2O_7$ and $Al_6Si_2O_{13}$ and was adjusted to have the composition of point X2 in the ternary phase diagram in FIG. 2. The wettability was evaluated by measuring the contact angle (wetting angle) between the powder-infiltrated substrate and the liquid phase raw material. The measurement temperature was 1500 to 1750° C. The measurement atmosphere was argon gas atmosphere. The temperature rise rate was 10° C./min.

Figure 9:
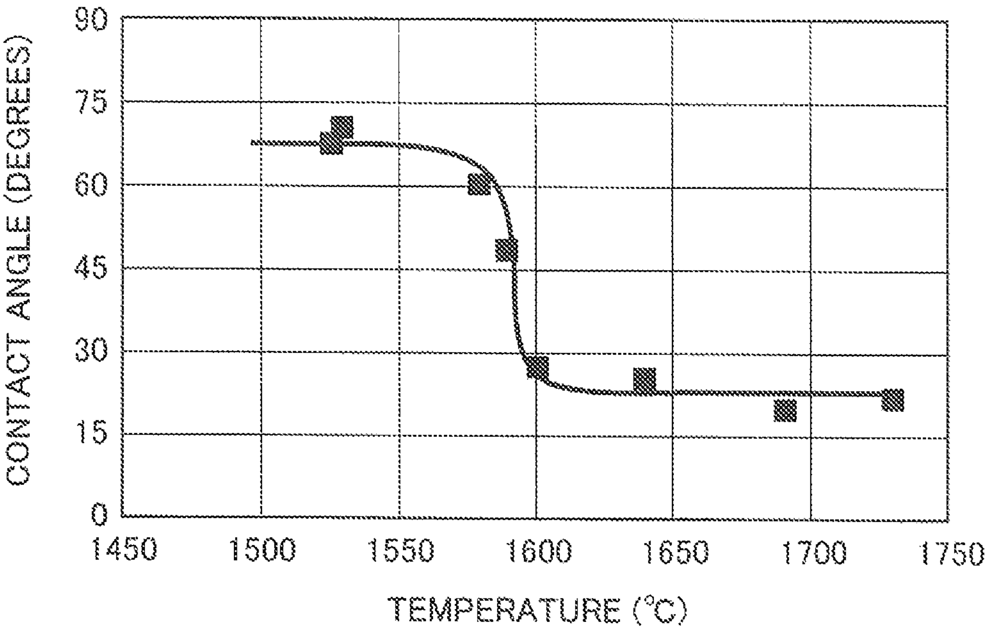
FIG. 9 is a graph illustrating a measurement result of wettability according to the embodiment of the present disclosure.

FIG. 9 is a graph illustrating a measurement result of wettability. In the graph of FIG. 9, the temperature is taken on the horizontal axis and the contact angle is taken on the vertical axis, and a relationship between the temperature and the contact angle is illustrated as a solid line. The liquid phase raw material is dissolved to be liquid at a temperature of 1500° C. or higher. The contact angle was approximately constant at about 70 degrees from 1500 to 1550° C. The contact angle greatly decreased to be 25 to 60 degrees from 1580 to 1600° C. The contact angle was 25 to 45 degrees from 1590 to 1600° C. The contact angle was approximately constant at 25 degrees at 1600° C. or higher. The result indicates that when the heat treatment temperature is 1580° C. or higher, the contact angle between the powder-infiltrated substrate and the liquid phase raw material decreases, and the wettability is improved, whereby the liquid phase raw material is easily melt-infiltrated into the powder-infiltrated substrate.

(Fatigue Properties Evaluation Test)

Fatigue properties of the ceramic matrix composite were evaluated. First, a method for manufacturing the ceramic matrix composite of example 3 is described. A preform made from a fabric formed from the silicon carbide fiber was used for the substrate. First, the preform was powder-infiltrated with $Yb_2SiO_5$ powder as the powder raw material by solid phase infiltration. The liquid phase raw material obtained by mixing $Yb_2Si_2O_7$ and $Al_6Si_2O_{13}$ is arranged on the powder-infiltrated preform and melt-infiltrated by heat treatment at a melting point of the liquid phase raw material or higher. The liquid phase raw material was set as a eutectic composition of $Yb_2Si_2O_7$ and $Al_6Si_2O_{13}$ and was adjusted to have the composition of point X2 in the ternary phase diagram in FIG. 2. The heat treatment temperature was 1600° C. The heat treatment time was 1 hour. The heat treatment atmosphere was argon gas atmosphere. In this manner, the matrix contained $Yb_3Al_5O_{12}$, $Yb_2Si_2O_7$, and the balance being an oxide of Yb, Al, and Si, or $Yb_2SiO_5$. The composition of the matrix had a composition range surrounded by points X1, X2, X3, and X4 in the ternary phase diagram in FIG. 2.

Next, a method for manufacturing the ceramic matrix composite of examples 4 and 5 is described. The method for manufacturing the ceramic matrix composite of examples 4 and 5 differs from that of the ceramic matrix composite of example 3 in the heat treatment temperature, but the configuration except the heat treatment temperature is the same. In the ceramic matrix composite of example 4, the heat treatment temperature was 1650° C. In the ceramic matrix composite of example 5, the heat treatment temperature was 1700° C.

Next, a method for manufacturing the ceramic matrix composite of comparative example 5 is described. The same preform as in example 3 was used for the substrate. As the matrix, the preform was infiltrated with a carbon powder and then reaction-sintered by melt infiltration with a molten silicon to form a SiC matrix.

A fatigue test was performed on the ceramic matrix composites of examples 3 to 5 and comparative example 5. The fatigue test was performed in accordance with ASTM C1275 and ASTM C1359. The test control was a load control, and the waveform was a sinusoidal wave. The frequency was 1 Hz, and the stress ratio was R0.1. In the fatigue test, the test temperature was 1400° C., and the test atmosphere was in air and in water vapor. Note that for example 3, the fatigue test was performed at 1400° C. in air and in water vapor. For examples 4 and 5 and comparative example 5, the fatigue test was performed at 1400° C. only in air. The fatigue test evaluated low cycle fatigue (LCF).

Figure 10:
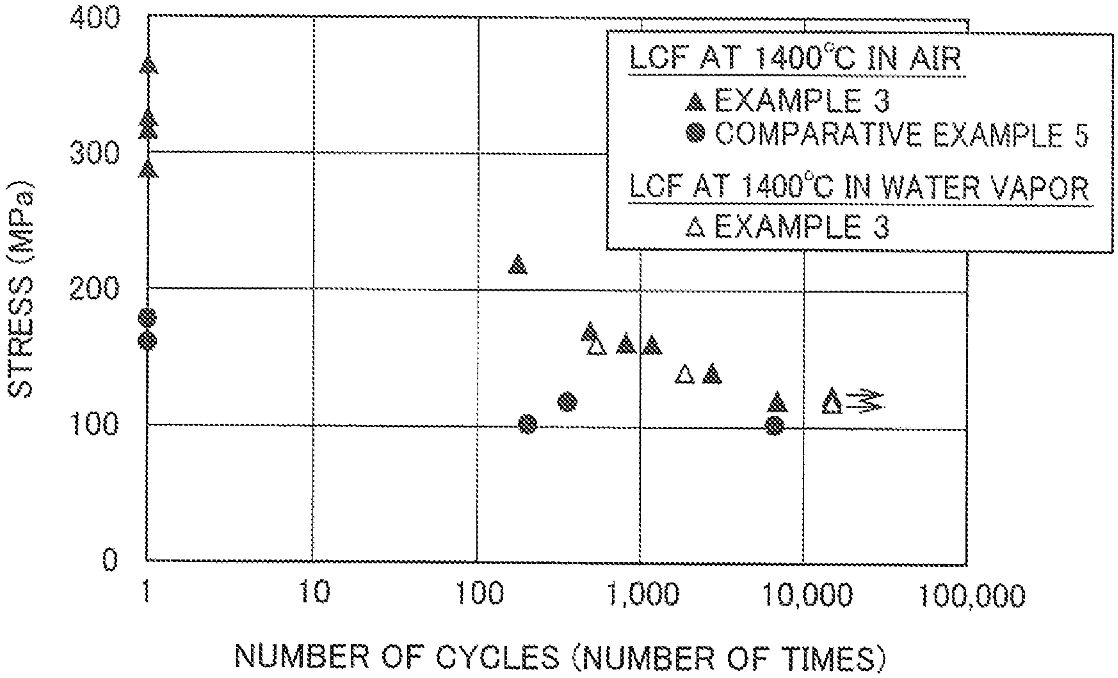
FIG. 10 is a graph illustrating a fatigue test result in each ceramic matrix composite according to the embodiment of the present disclosure.

FIG. 10 is a graph illustrating the fatigue test result for each ceramic matrix composite. In FIG. 10, the number of cycles are taken on the horizontal axis, and the stress is taken on the vertical axis. Black triangles represent fatigue properties of example 3 at 1400° C. in air, white triangles represent fatigue properties of example 3 at 1400° C. in water vapor, and black circles represent fatigue properties of comparative example 5 at 1400° C. in air. Note that arrows in the graph of FIG. 10 indicate that no fatigue failure has occurred. It is clear that example 3 has improved fatigue strength at 1400° C. in air compared to comparative example 5. Example 3 also had excellent fatigue properties even at 1400° C. in water vapor.

Figure 11:
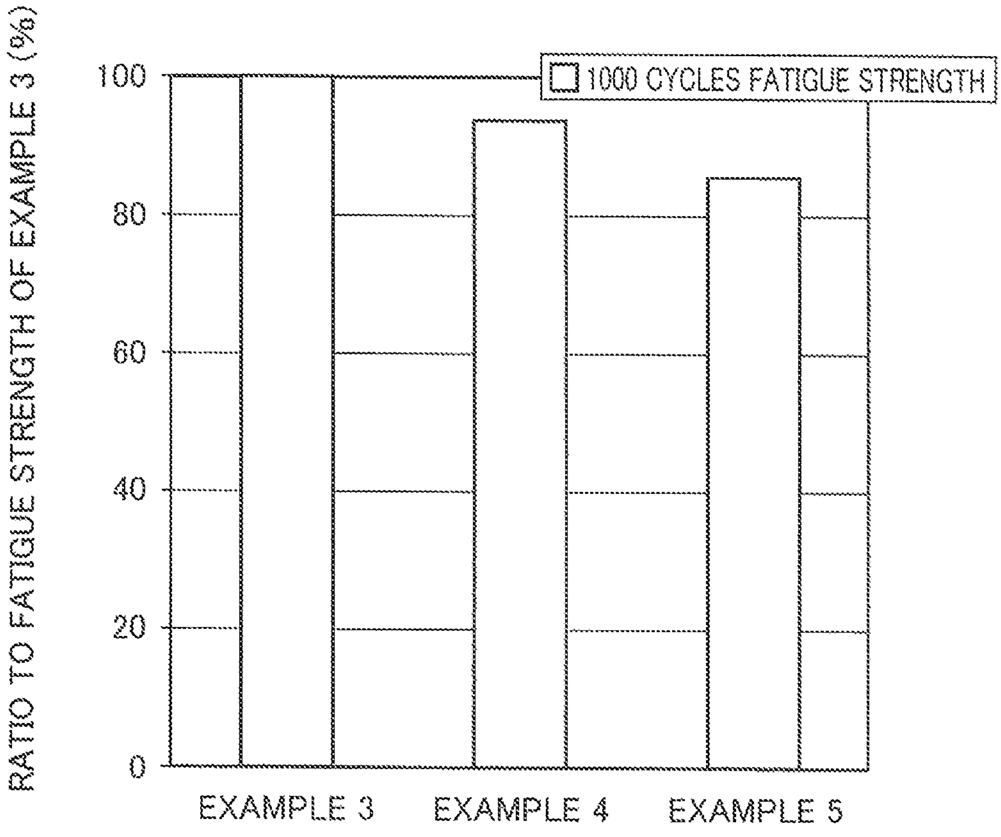
FIG. 11 is a graph illustrating fatigue strength in fatigue failure at 1000 cycles in each ceramic matrix composite according to the embodiment of the present disclosure.

Next, the fatigue strength of each ceramic matrix composite of examples 3 to 5 was compared at fatigue failure at 1000 cycles when the fatigue test was performed at 1400° C. in air. FIG. 11 is a graph illustrating the fatigue strength of each ceramic matrix composite at fatigue failure at 1000 cycles. In FIG. 11, each of the ceramic matrix composites of examples 3 to 5 is taken on the horizontal axis, the ratio to the fatigue strength of example 3 is taken on the vertical axis, and the ratio of the fatigue strength of each ceramic matrix composite is illustrated by a bar graph. When the fatigue strength of example 3 was 100%, the fatigue strength of example 4 was about 95%, and that of example 5 was about 85%. The result indicates that when the heat treatment temperature is higher, the fatigue strength tends to decrease due to thermal degradation of the silicon carbide fiber, and the like.

(Water Vapor Resistance Evaluation Test)

Water vapor resistance of the ceramic matrix composite was evaluated. The ceramic matrix composites of example 3 and comparative example 6 were used for the water vapor resistance evaluation. The ceramic matrix composite of comparative example 6 was made by subjecting a ceramic matrix composite of the same structure as that of comparative example 5 to oxidation resistance improvement treatment. The water vapor resistance evaluation test evaluated the decrease in strength before and after exposure to water vapor. Water vapor exposure was 500 hours at 1400° C.±10° C. The test atmosphere was a mixed gas of water vapor and air. The total pressure was 960 KPa, and the water vapor partial pressure was 80 KPa. The strength test before and after the water vapor exposure was the bending test at room temperature. The bending test was a four-point bending test and was performed in accordance with JIS R1601.

Figure 12:
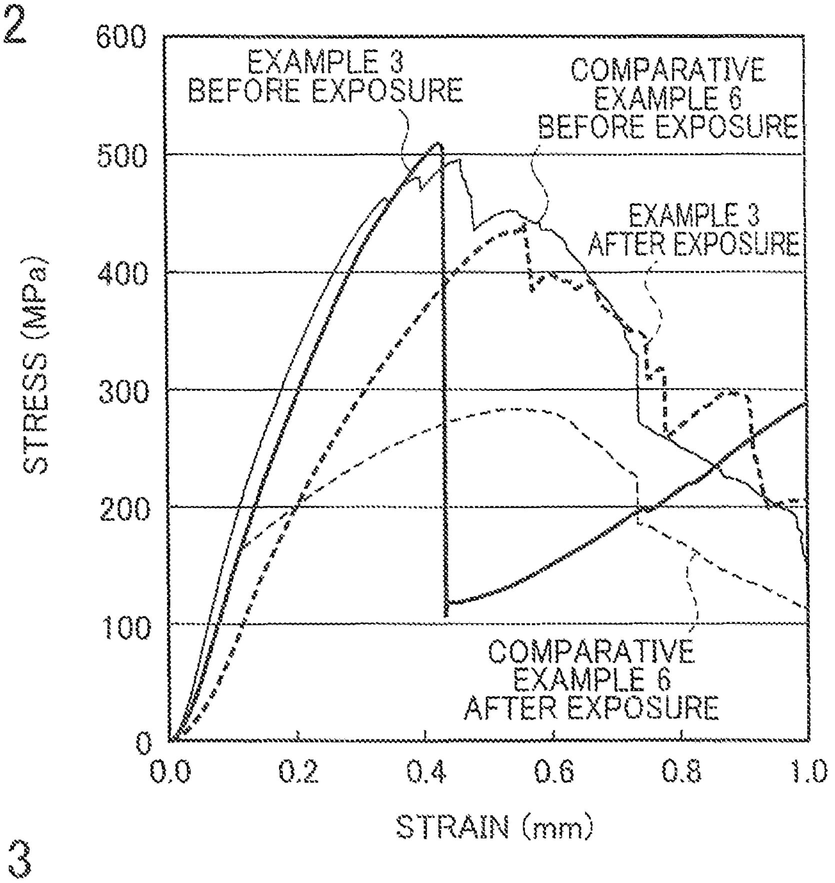
FIG. 12 is a stress-strain diagram in a bending test of each ceramic matrix composite before and after water vapor exposure according to the embodiment of the present disclosure.
Figure 13:
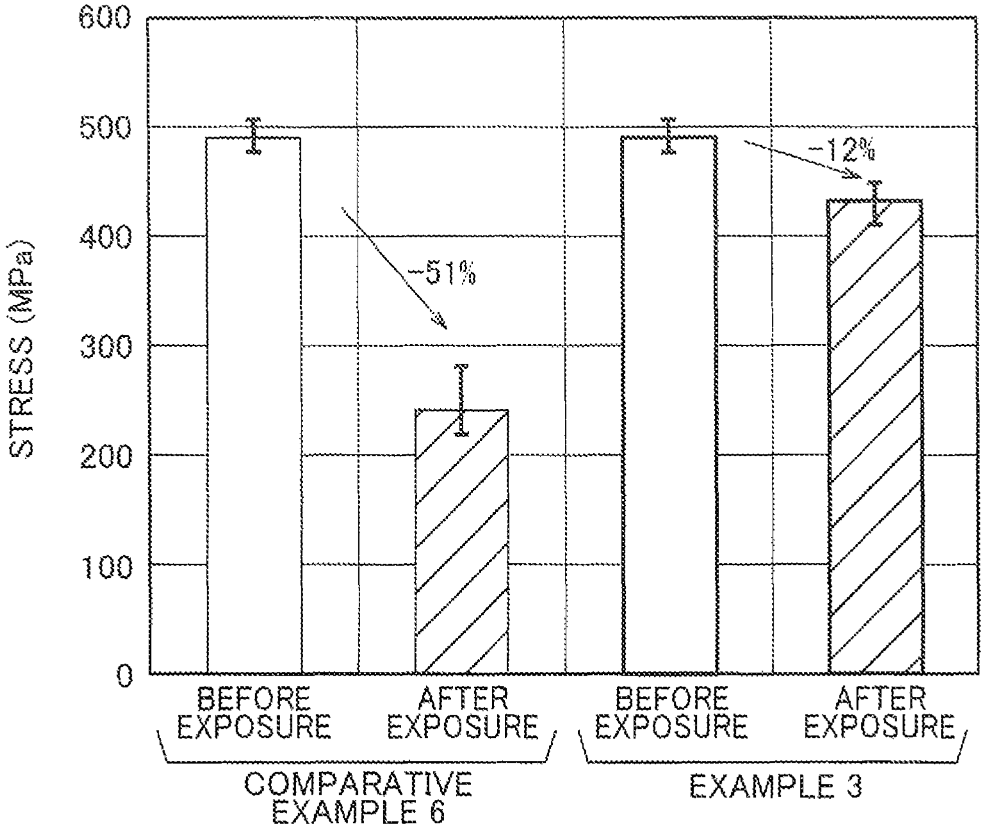
FIG. 13 is a graph illustrating strength degradation due to water vapor exposure in each ceramic matrix composite according to the embodiment of the present disclosure.

Next, the result of the water vapor resistance evaluation test is described. FIG. 12 is a stress-strain diagram for each ceramic matrix composite in the bending test before and after water vapor exposure. In FIG. 12, the strain is taken on the horizontal axis, the stress is taken on the vertical axis, and a thick solid line represents before water vapor exposure in example 3, a thick broken line represents after water vapor exposure in example 3, a thin solid line represents before water vapor exposure in comparative example 6, and a thin broken line represents after water vapor exposure in comparative example 6. FIG. 13 is a graph illustrating decrease in strength due to water vapor exposure in each ceramic matrix composite. In FIG. 13, the fracture stress is taken on the vertical axis, the ceramic matrix composite is taken on the horizontal axis, and the fracture stress of each ceramic matrix composite is illustrated by a bar graph. Decrease in strength after water vapor exposure was about 12% in example 3 and about 51% in comparative example 6. From this result, it is clear that the ceramic matrix composite of example 3 has excellent water vapor resistance properties.

The present disclosure is capable of further improving the heat resistance of the ceramic matrix composite and thus is useful for turbine parts and the like of a jet engine.

What is claimed is:

1. A ceramic matrix composite, comprising:

a substrate comprising a fibrous body formed from a silicon carbide fiber; and a matrix formed in the substrate, the matrix comprising $Yb_3Al_5O_{12}$ and $Yb_2Si_2O_7$ and having an average composition falling within a range surrounded by four points of X1 ($SiO_2$: 66.6 mol %, $Yb_2O_3$: 33.4 mol %, $Al_2O_3$: 0 mol %), X2 ($SiO_2$: 53.5 mol %, $Yb_2O_3$: 16.5 mol %, $Al_2O_3$: 30.0 mol %), X3 ($SiO_2$: 0 mol %, $Yb_2O_3$: 37.5 mol %, $Al_2O_3$: 62.5 mol %), and X4 ($SiO_2$: 50.0 mol %, $Yb_2O_3$: 50.0 mol %, $Al_2O_3$: 0 mol %) in a ternary phase diagram of a $SiO_2$—$Yb_2O_3$—$Al_2O_3$ system in FIG. 2.

2. The ceramic matrix composite according to claim 1, wherein the matrix further comprises an oxide which comprises Yb, Al, and Si, and which has a eutectic composition of $Yb_2Si_2O_7$ and $Al_6Si_2O_{13}$.

3. The ceramic matrix composite according to claim 1, wherein the matrix further comprises $Yb_2SiO_5$.

4. A method for manufacturing a ceramic matrix composite, comprising:

a powder infiltration step of powder-infiltrating a substrate comprising a fibrous body formed from a silicon carbide fiber, with a powder raw material, when a composition of the powder raw material is represented by three components of $SiO_2$, $Yb_2O_3$, and $Al_2O_3$, the powder raw material containing at least one component thereof; and a melt infiltration step of melt-infiltrating the substrate that has been powder-infiltrated, with a liquid phase raw material obtained by mixing $Yb_2Si_2O_7$ and $Al_6Si_2O_{13}$, by melting the liquid phase raw material by heat treatment at a melting point or higher of the liquid phase raw material, to form a matrix, the matrix comprising $Yb_3Al_5O_{12}$ and $Yb_2Si_2O_7$ and having an average composition falling within a range surrounded by four points of X1 ($SiO_2$: 66.6 mol %, $Yb_2O_3$: 33.4 mol %, $Al_2O_3$: 0 mol %), X2 ($SiO_2$: 53.5 mol %, $Yb_2O_3$: 16.5 mol %, $Al_2O_3$: 30.0 mol %), X3 ($SiO_2$: 0 mol %, $Yb_2O_3$: 37.5 mol %, $Al_2O_3$: 62.5 mol %), and X4 ($SiO_2$: 50.0 mol %, $Yb_2O_3$: 50.0 mol %, $Al_2O_3$: 0 mol %) in a ternary phase diagram of a $SiO_2$—$Yb_2O_3$—$Al_2O_3$ system in FIG. 2.

5. The method for manufacturing the ceramic matrix composite according to claim 4, wherein in the powder infiltration step, the powder raw material is a $Yb_2SiO_5$ powder.

6. The method for manufacturing the ceramic matrix composite according to claim 4, wherein in the melt infiltration step, the liquid phase raw material has a eutectic composition of $Yb_2Si_2O_7$ and $Al_6Si_2O_{13}$, and a heat treatment temperature of the liquid phase raw material is 1500° C. or higher.

7. The method for manufacturing the ceramic matrix composite according to claim 6, wherein in the melt infiltration step, the heat treatment temperature of the liquid phase raw material is 1500 to 1600° C.

8. The method for manufacturing the ceramic matrix composite according to claim 7, wherein in the melt infiltration step, the heat treatment temperature of the liquid phase raw material is 1580 to 1600° C., and a contact angle between the substrate that has been powder-infiltrated and the liquid phase raw material is 25 to 60 degrees.

9. The method for manufacturing the ceramic matrix composite according to claim 4, wherein the liquid phase raw material is integrally formed in advance by mixing $Yb_2Si_2O_7$ and $Al_6Si_2O_{13}$ and then melting them, before the melt-infiltrating.

* * * * *